(12) United States Patent
Voet

(10) Patent No.: US 11,388,313 B2
(45) Date of Patent: Jul. 12, 2022

(54) METHOD AND SYSTEM FOR IMPROVING THE PRINT QUALITY

(71) Applicant: IN(K) CONTROL BV, Deinze (BE)

(72) Inventor: Philippe Voet, Deinze (BE)

(73) Assignee: IN(K) CONTROL BV, Deinze (BE)

( * ) Notice: Subject to any disclaimer, the term of this patent is extended or adjusted under 35 U.S.C. 154(b) by 0 days.

(21) Appl. No.: 17/268,693

(22) PCT Filed: Aug. 21, 2019

(86) PCT No.: PCT/IB2019/057048
§ 371 (c)(1),
(2) Date: Feb. 16, 2021

(87) PCT Pub. No.: WO2020/039367
PCT Pub. Date: Feb. 27, 2020

(65) Prior Publication Data
US 2021/0234992 A1 Jul. 29, 2021

(30) Foreign Application Priority Data
Aug. 22, 2018 (BE) .................................. 2018/5579

(51) Int. Cl.
*H04N 1/60* (2006.01)
*H04N 1/62* (2006.01)
*H04N 1/00* (2006.01)

(52) U.S. Cl.
CPC ......... *H04N 1/628* (2013.01); *H04N 1/00938* (2013.01); *H04N 1/603* (2013.01)

(58) Field of Classification Search
CPC .... H04N 1/628; H04N 1/00938; H04N 1/603; H04N 1/6052
See application file for complete search history.

(56) References Cited

U.S. PATENT DOCUMENTS 5,185,673 A * 2/1993 Sobol ................... H04N 1/6033
358/463
5,333,243 A * 7/1994 Best ........................ H04N 1/60
358/1.9
(Continued)

FOREIGN PATENT DOCUMENTS

EP 3537697 A1 * 9/2019 ............... G09G 5/02
JP 2018107652 A * 7/2018 ......... G06K 15/1859
(Continued)

OTHER PUBLICATIONS

ISR/WO for PCT/IB2019/057048 (parent to this application) dated Dec. 6, 2019.

*Primary Examiner* — Ted W Barnes
(74) *Attorney, Agent, or Firm* — Vorys, Sater, Seymour and Pease LLP

(57) ABSTRACT

In a first aspect, the invention relates to a method for improving an image quality when printing an electronic image file by a user, the method comprising (a) receiving an original electronic image file from a user, (b) generating a modified electronic image file, and (c) providing the modified image file to the user. In particular, other printing data are also received from the user, which printing data comprise at least a printer model and optionally a firmware version according to a non-limiting embodiment, in which the modified image file is generated taking into account said printer data. In a further aspect, the invention relates to a computer-implemented system.

17 Claims, 4 Drawing Sheets

(56) References Cited

U.S. PATENT DOCUMENTS

| | | | | |
|---|---|---|---|---|
| 5,588,050 | A * | 12/1996 | Kagawa | H04N 1/6016 358/518 |
| 6,048,117 | A * | 4/2000 | Banton | H04N 1/00002 400/74 |
| 6,247,011 | B1 * | 6/2001 | Jecha | G06F 3/1288 707/999.009 |
| 7,092,119 | B1 * | 8/2006 | Hinds | H04N 1/6033 358/1.11 |
| 8,717,627 | B2 * | 5/2014 | Samworth | H04N 1/407 358/2.1 |
| 9,025,222 | B1 * | 5/2015 | Li | H04N 1/6033 358/1.9 |
| 9,036,181 | B2 * | 5/2015 | Chang | G06K 15/181 358/1.15 |
| 2002/0149786 | A1 * | 10/2002 | Hudson | H04N 1/6058 358/1.9 |
| 2003/0156299 | A1 * | 8/2003 | Martinez | H04N 1/6052 358/1.9 |
| 2003/0193677 | A1 * | 10/2003 | Zeng | H04N 1/6025 358/1.9 |
| 2003/0223634 | A1 * | 12/2003 | Gallagher | H04N 1/6058 382/167 |
| 2004/0070619 | A1 * | 4/2004 | Yoshio | G06F 3/04845 715/764 |
| 2004/0207670 | A1 * | 10/2004 | Niekawa | B41J 11/00214 347/9 |
| 2004/0223173 | A1 * | 11/2004 | Arai | H04N 1/6033 358/1.9 |
| 2005/0259276 | A1 * | 11/2005 | Smith, II | H04N 1/60 358/1.9 |
| 2006/0013477 | A1 * | 1/2006 | Pellar | H04N 1/6027 382/162 |
| 2006/0066671 | A1 * | 3/2006 | Kato | H04N 1/6022 347/43 |
| 2007/0024889 | A1 * | 2/2007 | Eldridge | G06F 3/1218 358/1.14 |
| 2007/0070467 | A1 * | 3/2007 | Wilms | H04N 1/6033 358/518 |
| 2007/0133017 | A1 * | 6/2007 | Kobayashi | G06T 11/001 358/1.9 |
| 2008/0074687 | A1 * | 3/2008 | Upton | H04N 1/644 358/1.9 |
| 2008/0079976 | A1 * | 4/2008 | van de Capelle | G06F 3/1205 358/1.13 |
| 2008/0079977 | A1 * | 4/2008 | van de Capelle | G06F 3/1205 358/1.13 |
| 2008/0144141 | A1 * | 6/2008 | Tai | H04N 1/603 358/518 |
| 2008/0166043 | A1 * | 7/2008 | Bassi | H04N 1/60 382/167 |
| 2008/0278744 | A1 * | 11/2008 | Marchesotti | H04N 1/603 358/1.15 |
| 2009/0033954 | A1 * | 2/2009 | Bray | H04N 1/6033 358/1.9 |
| 2009/0116048 | A1 * | 5/2009 | Usami | H04N 1/6011 358/1.9 |
| 2009/0153887 | A1 * | 6/2009 | Lin | H04N 1/62 358/1.9 |
| 2009/0174909 | A1 * | 7/2009 | Li | H04N 1/6033 358/3.08 |
| 2009/0310152 | A1 * | 12/2009 | Roulland | H04N 1/6058 358/1.9 |
| 2010/0328688 | A1 * | 12/2010 | Sakamoto | H04N 1/6036 358/1.9 |
| 2011/0026042 | A1 * | 2/2011 | Cogan | G06F 3/1287 358/1.18 |
| 2011/0194125 | A1 * | 8/2011 | Rivshin | H04N 1/603 358/1.9 |
| 2012/0285343 | A1 * | 11/2012 | Schulmeister | B41F 33/0009 101/484 |
| 2013/0033517 | A1 * | 2/2013 | Choi | G06T 11/001 345/589 |
| 2014/0063550 | A1 * | 3/2014 | Wilen | G06F 3/1297 358/1.15 |
| 2017/0177975 | A1 * | 6/2017 | Yu | G06K 9/6256 |
| 2017/0197449 | A1 * | 7/2017 | Singamsetty | G06F 3/1205 |
| 2017/0223127 | A1 * | 8/2017 | Matsutani | H04L 67/55 |
| 2017/0282606 | A1 * | 10/2017 | Yatsunami | B41J 11/0095 |
| 2017/0282609 | A1 * | 10/2017 | Yatsunami | B41J 13/0009 |
| 2017/0346964 | A1 * | 11/2017 | Panda | G06F 3/121 |
| 2017/0374234 | A1 * | 12/2017 | Leskanic | H04N 1/6075 |
| 2019/0124233 | A1 * | 4/2019 | Fukasawa | H04N 1/6011 |
| 2020/0404125 | A1 * | 12/2020 | Oya | H04N 1/6027 |

FOREIGN PATENT DOCUMENTS

| | | |
|---|---|---|
| WO | 2003011598 A1 | 2/2003 |
| WO | 2020039367 A1 | 2/2020 |

* cited by examiner

METHOD AND SYSTEM FOR IMPROVING THE PRINT QUALITY

TECHNICAL DOMAIN

The invention relates to methods and systems for improving the print quality and/or correcting printing errors, in particular in digital printing.

STATE OF THE ART

An important advantage of digital printing techniques with respect to conventional printing techniques (e.g. offset printing, typographic printing and flexographic printing) is that the ink/toner is transferred directly to the substrate, thus without use of offset plates. Consequently, digital printing techniques are usually very flexible, with a limited fixed cost per printing job. Digital printing is thus perfect for printing in limited editions, more in particular for office printing and (private) home printing. As a result, a lot of user-friendly digital printing devices are available on the market, that are especially designed for such applications.

On the other hand, for high-end applications (for example in a professional or semi-professional context), an important point of interest is often that the printing quality should be impeccable. For example, from the commercial point of view, it is very important that the colours and shapes on packagings for cosmetics, care products and food are in the exact place; this is amongst other things the case for colours relating to the human skin. At the same time, there is a tendency with manufacturers and fillers of such products—and with consumers in general—to print the packagings themselves, instead of outsourcing it to specialized printing companies. Here too, use is typically made of digital printing devices, that are of course subjected to very high-quality standards.

The final printing quality is significantly determined by processes preceding the actual printing. They fall into the general category of "digital pre-press", of shortly "pre-press". For example, an image should be rasterized in an appropriate way, before it can be communicated to the digital printing mechanism. This process is also called the "ripping" of the image, referring to the "Raster Image Processor (RIP)".

Usually, the firmware of printers possesses its own RIP functionality. However, digital pre-press—and rasterizing/ripping in particular—is very delicate. In a professional setting (with high quality standards), digital printing preparation is therefore always a task for experienced professionals, with the use of expensive, specialized software. On the other hand, the associated investments in staff and software are not cost-effective when printing is only a subsidiary activity, for example for prosumers such as the above-mentioned fillers and manufacturers of cosmetics. Thus, the printing quality is yet in danger. The costs in case of a failed pre-press can moreover rise significantly, considering the high cost price of inks and toners, and considering the inherent high operational costs of printing installations.

As to home printing and office printing, the quality requirements are usually a lot less strict. Only sporadically, printing should be of high quality, so that the firmware (amongst other things the RIP) of such printers is not specially adapted thereto. Moreover, the often generic firmware does insufficiently take into account individual differences from printer to printer, and the wear of the printers. Here too, the printing quality is thus in danger.

From time to time, suppliers of printing devices provide new firmware versions. They try to solve the printing errors known until then. However, the irregular updates of the firmware lead to serious fluctuations in printing quality. Firmware updates are also not without any risks; in case of failure of the firmware update, the printing device does not contain any valid firmware anymore, and it will thus not work anymore. In a number of cases, an increased ink consumption/toner consumption has moreover been found, after realizing a firmware update. On the other hand, for some printer models, it is not possible or at least very time-consuming to update the firmware.

The present invention has as a purpose to improve the printing quality at a controllable cost. In particular, the invention is applicable for home printing and office printing, and in any context in which printing is only a subsidiary activity.

U.S. Pat. No. 8,717,627 describes a method for correcting dot gain, a typical problem in offset printing, and not so much in digital printing. In particular, the colour tone of the digital image file is adapted, based on a set of predetermined curves. However, this requires the use of specialized software, by experienced professionals.

Furthermore, U.S. Pat. No. 6,247,011 describes how a printing design can be created from a client computer. Subsequently, this printing design is uploaded to a server, where it is converted into a prepress format. In a final step, it is printed by a printer.

Finally, U.S. Pat. No. 6,048,117 also describes the calibration of printers on a network, by printing and scanning colour cartridges, with exchange of identification data of the printers. Thereby, a colour correction table is generated, for the calibration of the printing devices from the network. In other words, it is focussed on an adjustment of the printer firmware via calibration.

The invention now tries to offer a solution for at least one of the above-mentioned problems, with the purpose to improve the printing quality. Preferably, the user takes care not to incur too many costs (such as the purchase of software, or the recruitment of specialized staff) and expenses (such as firmware updates, or printer calibrations).

SUMMARY OF THE INVENTION

Thereto, the invention provides in a first aspect for a method of claim 1, for improving the image quality when printing an electronic image file by a user. In particular, a modified image file is generated, based on an original image file that is supplied by the user, and taking into account the supplied printer data. This modified image file is again supplied to the user, for printing it.

Optionally, the original electronic image file is sent (electronically/digitally) by the user. Optionally, the modified electronic image file is sent back (electronically/digitally) to the user. In principle, the original image file is preferably already appropriate for (digital) printing. However, the invention provides a modified image file, also appropriate for being printed (digitally), but in which moreover some modifications have been integrated. For example, it can be about compensations of expected deviations from the printing behaviour of the printing device.

It is particularly advantageous that modifications are built into the modified image file itself, even before it is communicated to the digital printing device. This allows to adjust the printing behaviour of the printing device very specifically, adapted to the image file. Direct interventions such as firmware updates and printer calibrations are thereby avoided. Moreover, the users do not necessarily have to use their own knowledge and/or own software, for example in case the present method is offered as a service to an external party. Thereby, the method is extremely appropriate for home printing and office printing, and in any context in which printing is only a subsidiary activity.

In a second aspect, the invention provides another system of claim 15 for improving the image quality.

DETAILED DESCRIPTION

The invention relates to a method and a system for improving the image quality when printing electronic image files by users.

Unless otherwise specified, all terms used in the description of the invention, including technical and scientific terms, shall have the meaning as they are generally understood by the worker in the technical field of the invention. For a better understanding of the description of the invention, the following terms are explained specifically.

"A", "an" and "the" refer in the document to both the singular and the plural form unless clearly understood differently in the context. "A segment" means for example one or more than one segment.

When "approximately" or "about" are used in the document together with a measurable quantity, a parameter, a period or moment, etc., variations of +/−20% or less, preferably +/−10% or less, more preferably +/−5% or less, still more preferably +/−1% or less, and even still more preferably +/−0.1% or less than and of the cited value are meant, as far as such variations apply to the invention that is described. It will however be clearly understood that the value of the quantity at which the term "approximately" or "about" is used, is itself specified.

The terms "include", "including", "consist", "consisting", "provide with", "contain", "containing", "comprise", "comprising" are synonyms and are inclusive or open terms that indicate the presence of what follows, and that do not exclude or prevent the presence of other components, characteristics, elements, members, steps, known from or described in the state of the art.

The citation of numeric intervals by means of end points includes all integers, fractions and/or real numbers between the end points, including these end points.

Figure 3:
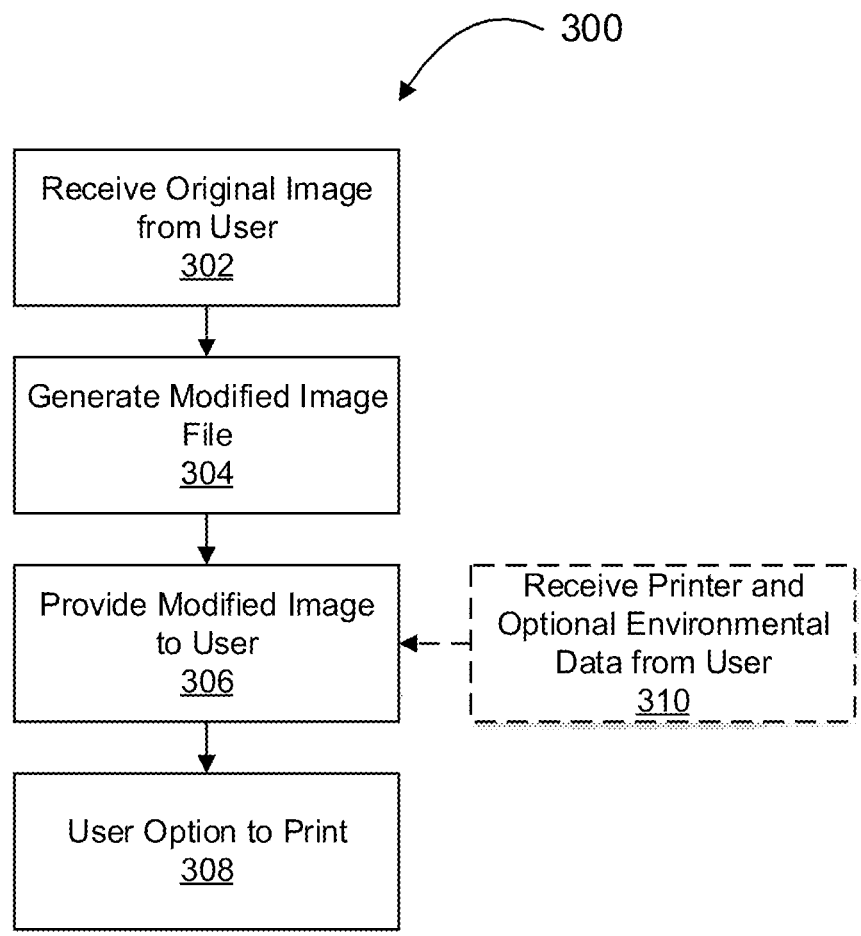
FIG. 3 is a schematic illustration of a method for improving the image quality, according to an embodiment of the invention.

In a first aspect, and with reference to FIG. 3, the invention relates to a method 300 for improving an image quality when printing an electronic image file by a user, the method comprising (a) receiving an original electronic image file 302 from a user, (b) generating a modified electronic image file 304, at least based on the original image file and (c) providing the modified image file to the user 306, for printing it by the user by means of a printing device of the user. In particular, printing data are further also received from the user 310, which printing data relate to said printing device, and which printing data comprise at least a printer model and optionally a firmware version according to a non-limiting embodiment, in which the modified image file is generated taking into account said printer data. Preferably, the printer data comprise at least one of (a) a printer model and optionally a firmware version, (b) measurement data related to the printer and (c) one or more scans of printed image files. The user may then print 308 the modified image.

Optionally, the original electronic image file is sent electronically/digitally by the user. Optionally, the modified electronic image file is sent back electronically/digitally to the user.

In principle, the original image file is preferably already appropriate for (digital) printing. However, the invention provides a modified image file, which is also appropriate for being printed (digitally), and in which moreover some modifications have been integrated. For example, it can be about compensations of expected deviations from the printing behaviour of the printing device. According to a non-limiting example, the image files are sent and/or sent back via email. According to an alternative, non-limiting example, the original image file is automatically sent, after it has been uploaded onto an electronic platform by a user. Optionally, the modified image file is than sent back automatically to the user, meaning it can be downloaded from an electronic platform by the user. Optionally, it is twice the same electronic platform.

In a further or alternative embodiment, printer data comprise at least one of:

a printer model and optionally a firmware version,
measurement data related to the printing device, and
one or more scans of printed image files.

The "image quality when printing" is here also referred to as the "printing quality", and relates to the image quality of the electronic image file printed by the user. Preferably, an "electronic image file", as used here, comprises a two-dimensional pixel map. It can comprise presentations of text and/or images.

The "printer data" can comprise any information with respect to the printing device. Optionally, the printer data comprise a firmware version of the printing device. Preferably, they comprise at least a printer model, in which the "printer model" refers to amongst other things a model number, a model name and/or a serial number. Moreover, a printer model can also refer to an umbrella group of two or more printer models, of which the printing devices show a similar printing behaviour. Preferably, said printer data allow to estimate the printing behaviour of the printing device at least partially. The printer data and possible, other data can moreover be supplied manually and/or automatically by the user, or by a user device of the user.

In a possible embodiment, the printing behaviour can be estimated at least partially, by testing the printer data against a database in which they are linked to a corresponding printing behaviour. This allows to modify, specifically for a particular printing job, the corresponding original image file, e.g. by integrating compensations for possible shortcomings in the printing device. Such compensations could for example relate to a colour density and/or a colour distribution, as has been described below.

It is particularly advantageous that such modifications can be integrated in the image file itself, by the creation of a modified image file from the original image file.

Only then, the (modified) image file is supplied to the digital printing device. Via this method, direct interventions on the printing device (e.g. firmware updates or calibrations) are avoided. Moreover, the users do not necessarily have to use their own knowledge and/or their own software. For example, the present method could be offered as a service to an external party. Thereby, the method is extremely appropriate for home printing and office printing, and in any context in which printing is only a subsidiary activity.

Moreover, the present method allows a very specific intervention, especially adjusted to the image file, the targeted image quality and printing device. This intervention can be realized very efficiently, with a minimum burden for the user. Preferably, the method can moreover be applied on a plurality of users with corresponding printing devices.

In a further or alternative embodiment, the method is a computer-implemented method. However, alternatively, it is only partially computer-implemented, and it comprises one or more human interventions, for example when generating a modified image file based on the original image file.

In a further or alternative embodiment, an electronic platform is offered to the user, for the exchange of electronic image files and/or printer data with the user. Such a platform can amongst other things be appropriate for (a) receiving an original image file from a user, (b) supplying a modified image file to a user, and/or (c) receiving one or more printer data from a user. In a possible embodiment, the electronic platform is a web application where users can log in, and where such data can be uploaded and/or downloaded. In another, possible embodiment, the image files and/or printer data are exchanged via email, or via any other method. Optionally, the method can serve a plurality of spatially distributed users, from one or more central servers provided at central locations. Thereby, preferably, use is made of electronic exchange of information.

As is known from the printing technique, digital image files should be rasterized, before they can be communicated to the printing mechanism. This allows to reproduce the desired colour densities by means of basic inks/basic toners. In colour printing, moreover, a colour distribution of the image file must be realized, in which the image file is split up according to individual basic colours, in appropriate and mutually balanced colour densities. For example, a CMYK colour system is thereby followed, but this is not necessarily the case.

In a further or alternative embodiment, the modified image file comprises a modified colour density and/or colour distribution with respect to the original image file.

Thereby, it is possible to compensate in advance for deviations in the printing behaviour of the printing device, via appropriate modifications (e.g. compensations) in the colour densities as specified in the electronic image file.

For example, this is advantageous if for a set of predefined printer data (and possibly other additional data), it can be expected that the printed colour density will not correspond to the desired colour density. The original image file is then correspondingly modified/compensated, for forming the modified image file. Amongst other things, a possible colour shift, as a result of an imbalance in the colour densities of the individual basic colours, can thereby be corrected.

According to a further or alternative embodiment, the modified image is rasterized. Often, the required colour densities for the individual pixels are only determined during the rasterizing/ripping process. In possible embodiments, the present method provides at least the rasterizing of the original image file, and optionally still one or more compensations for the printing behaviour of the printing device. However, in alternative embodiments, the modified image file is not rasterized yet. A separate RIP, optionally comprised by the printing device, ensures this. However, the modified image can possibly already comprise compensations for the printing behaviour of that printing device.

In a further or alternative embodiment, the modified image file comprises compensations for one or more expected printing errors of the printing device. Hereby, it is not necessary to adjust the firmware of the printing device, for example by calibrating the device. At least a part of the corrections is indeed integrated in the modified image file itself. In possible embodiments, it can be stipulated that the modified image file is corrupted; that errors were integrated; which errors compensate one or more expected printing errors of the printing device.

In a further or alternative embodiment, one or more environmental parameters are also received from the user. For example, the printed colour densities are influenced by the temperature and humidity in the environment of the printing device. In case of too strong fluctuations in these environmental parameters, it can be indicated to realize calibrations regularly. However, the present embodiment allows the compensate this, by means of modifications in the image file itself. Knowledge of these and other environmental parameters thus generally allow to still even better estimate the printing behaviour of printing devices, and to even better compensate possible deviations. According to a non-limiting embodiment, thereto, a database is again consulted, from where the printing behaviour can be predicted depending on these environmental parameters. For example, a prediction of the effectively printed colour density, in function of the requested colour density, and in relation to these parameters, could be shown in a table, or via an empirical formula.

Of course, there still are many other parameters/data which can influence the printing behaviour of a printing device. According to a further or alternative embodiment, the user also provide data with respect to a paper type and/or ink type that will be used when printing, and/or with respect to the speed with which it will be printed. Possibly, also the wear of the printing device and/or the toner cartridges/ink cartridges is taken into account. This wear can be expressed as a total number of printing hours, as a total distance that has been printed, or as a filling level of the cartridges, if applicable.

In a further or alternative embodiment, the modifications of the modified image file with respect to the original image file essentially relate to colours figuring in the human skin. In particular applications, it is particularly important that such colours are very precise, for example on packagings for cosmetics, care products and food. Preferably, the modified image file thereby takes into account the specifications and imperfections of the printing device, in order to display these colours as truthfully as possible in the final print.

For example, an imbalance in colour density, in which a too large quantity of magenta is administered systematically, will cause the skin colour in the range of pink/beige to shift to red. Simply the corresponding adjustment of the printed magenta colour density, for example by integrating compensations in the modified image file, can suffice for making these skin colour much more truthful.

In a further or alternative embodiment, one or more scans of printed image files are received from the user. In a non-limiting embodiment, the original image file is printed and scanned. Based on this scan, combined with the original image file, it is possible to estimate deviations of the printing device, specifically for that image file. Subsequently, a modified image file is generated, for compensating these deviations. Possibly, it relates to an iterative process, in which the printing quality is improved incrementally. By means of scans, printing deviations can be identified very efficiently, without the underlying cause having to be known. It is advantageous that many home printers typically also comprise a scanning device.

In a further or alternative embodiment, a modified colour density is at least determined based on a printed colour density, as determined based on said scans, and a desired colour density. The term "colour density", as used here, is also referred to as the "coverage percentage". In a possible embodiment, the desired colour density is as prescribed by the original image file (directly or possibly indirectly, e.g. because rasterizing should still be realized). However, when printing that original image file, the printed colour density does not completely correspond to the desired colour density, for at least one of the basic colours. The degree of deviation can be derived from said scans, that are supplied by the user. A modified image file is generated, in which these deviations are compensated for. When printing the modified image file (with the modified colour density or densities), the desired colour density is better approached.

A possible problem with ink jet printing is that the nozzles at least partially get blocked after a while. Typically, the printed colour density is therefore slightly higher when using a new printing device (or new ink cartridges, if the nozzles are integrated therein). However, when using the printing device, this colour density further decreases. If, for a particular printing job, the colour density must be precise, the present method can be applied. Thereby, it is not necessary to calibrate the printing device.

In a further or alternative embodiment, a database is further supplemented and/or updated by means of information that is comprised in the printer data and said scans. In a non-limiting embodiment, said scans allow to predict the expected printing behaviour for a particular printer model. Such information is then added to a database. At a next printing job with that same printer model (possibly even with the same printing device, and optionally under similar circumstances as described above), this information can again be consulted, so that the printing behaviour can better be predicted. The scans can comprise reproductions of the printed, original image file and/or of the printed, modified image file.

In a possible embodiment, all kinds of printer data are collected, and optionally also one or more scans of printed image files, based on which a general printer profile is than composed for one or more printer models. These data are placed in a database; for new printing jobs, the database can be supplemented with new information. For example, the general printer profile can allow to estimate possible printing errors for a particular printing device. The modified image file can then be compensated correspondingly. The general printer profile can take into account the age of the printer, with environmental parameters and similar.

In a further or alternative embodiment, the image files represent a print for packaging material and/or labelling material. Application of the method in printings for the packaging industry and/or labelling industry is particularly advantageous, as said above.

In a further or alternative embodiment, a print of the modified image file, compared to a print of the original image file, comprises a similar of preferably a higher image quality.

In a further or alternative embodiment, a print of the modified image file possesses, by means of the printing device, a higher image quality than a print of the original image file, by means of the printing device, for example measured via MOS, without an increase of the amount of ink used thereby. MOS (Mean Opinion Score), known from the telephony, is only one appropriate technique to quantify image quality. In a further or alternative embodiment, a print of the modified image file possesses, by means of the printing device, a similar image quality to a print of the original image file, by means of the printing device, for example measured via MOS, with a decrease of the amount of ink used therein.

In a second aspect, the invention relates to a computer-implemented system for improving an image quality when printing an electronic image file by a user, the system comprising server, which server is configured for (a) receiving an original electronic image file from a user, (b) generating a modified electronic image file, at least based on the original image file and (c) sending the modified image file to the user, for printing it by the user by means of a printing device of the user. In particular, the system is further configured for the receipt of printer data from the user, which printing data relate to said printing device, and which printing data comprise at least a printer model and optionally a firmware version according to a non-limiting embodiment, in which the modified image file is generated taking into account said printer data. Preferably, the system is appropriate for realizing the method according to the first aspect of the invention. Thereby, the same characteristics and advantages can be repeated. Preferably, the printer data comprise at least one of (a) a printer model and optionally a firmware version, (b) measurement data related to the printer and (c) one or more scans of printed image files.

In a further or alternative embodiment, the system further comprises also at least one user device and at least one digital printing device, which printing device is coupled to said user device. Preferably, the user device is thereby configured for receiving a modified image file, coming from the server. Preferably, the printing device is thereby configured for printing that modified image file by the user/by the user device. Optionally, the system comprises a plurality of user devices and associated digital printing devices. Optionally, the system can thereby serve a plurality of spatially distributed users, from one or more central servers provided at central locations. Thereby, preferably, use is made of electronic exchange of information.

In the following, the invention will be described by means of non-limiting examples and/or figures illustrating the invention, and not meant to be interpreted as limiting the scope of the invention.

Figure 1:
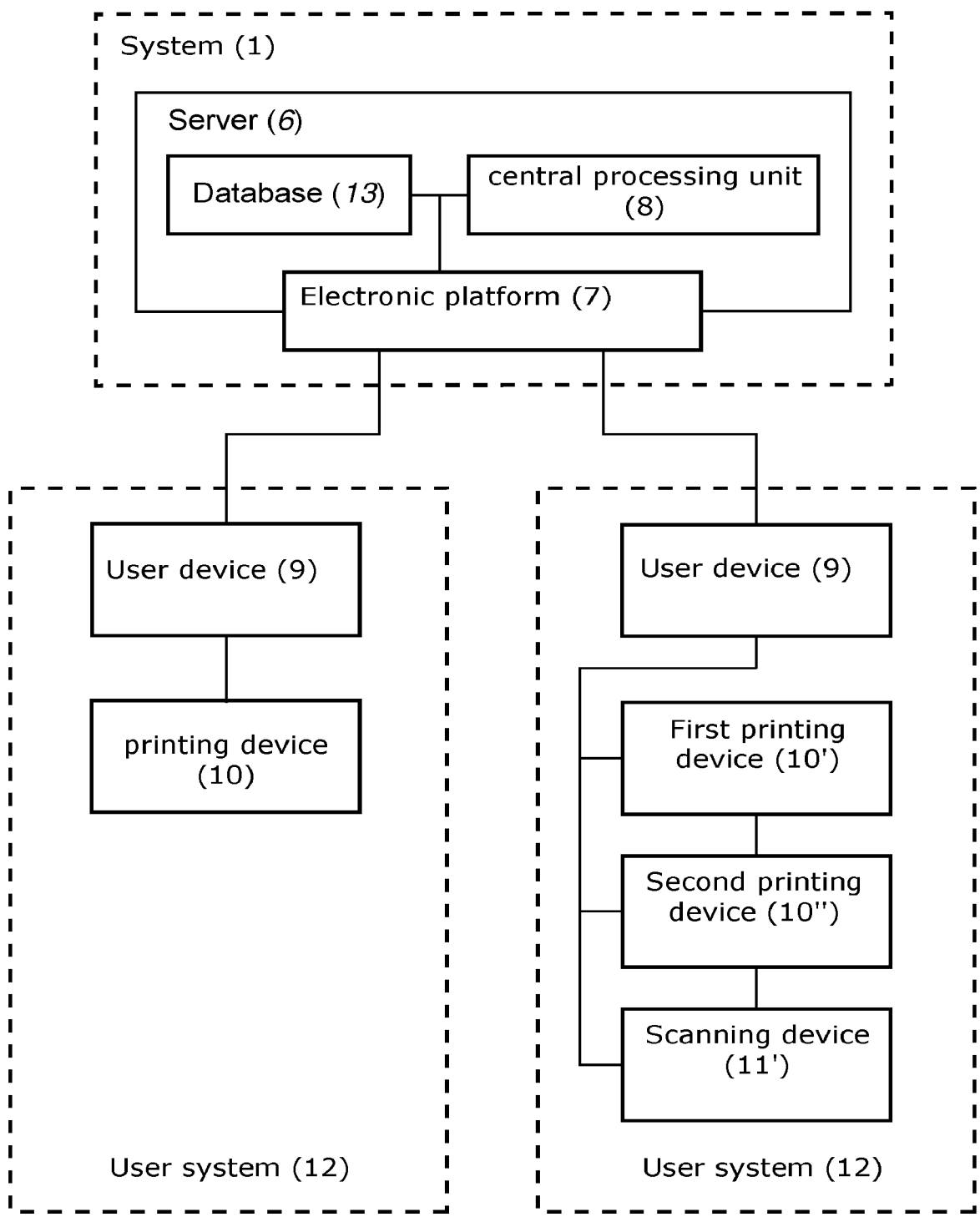
FIG. 1 is a schematic illustration of a system for improving the image quality, according to an embodiment of the invention.

FIG. 1 is a schematic illustration of a system 1 for improving the image quality, according to an embodiment of the invention. The system 1 comprises a server 6 with a central processing unit 8 for generating a modified image file 5, based on an original image file 4. The system further also comprises an electronic platform 7, for the exchange of image files and/or printer data with separate user systems 12. These user systems 12 can or cannot by comprised by the present system 1 itself. Optionally, the system 1 for example ensures communication with a number of external user systems 12 of separate users. Each user system 12 comprises a user device 9, and at least one digital printing device 10, in communication with it. Optionally, a user system 12 comprises one or more printing devices 10', 10", and/or scanning devices 11.

Figure 2A:
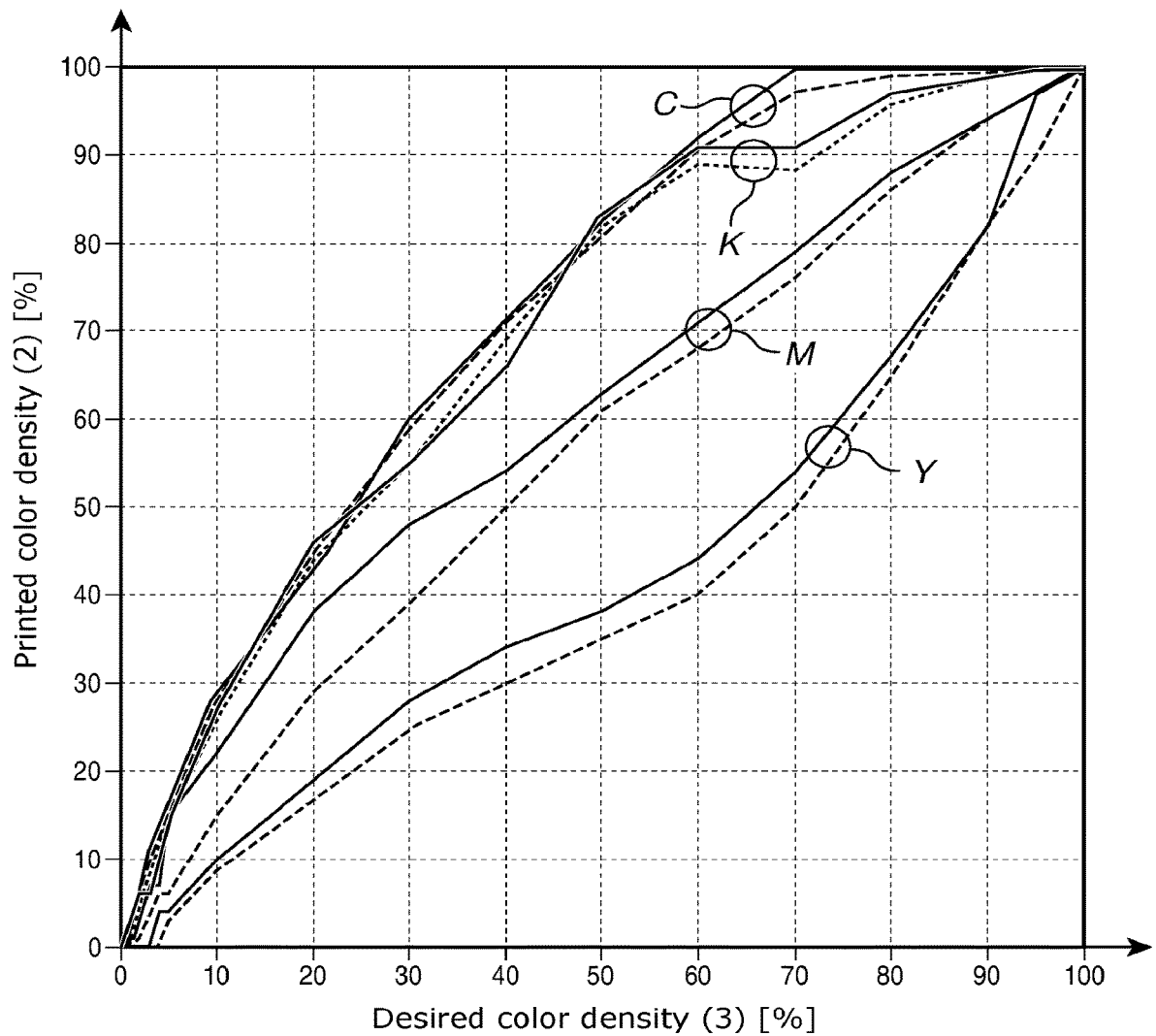
FIG. 2A shows two measurements of the effectively printed colour density, as a function of the desired colour intensity, when printing an original electronic image file, according to a possible embodiment.

FIG. 2A shows two measurements of the effectively printed colour density 1, as a function of the desired colour intensity 2, when printing an original electronic image file 3. The image file 3 was printed by a not further specified ink jet printer. Separate measurement results are given for the separate basic colours, according to a CMYK colour distribution. The measurement results are collected at two times: 27 Sep. 2016 (full line) and 6 Nov. 2016 (dotted line), under essentially the same circumstances as to temperature and humidity. Especially as a result of the partial blocking of the nozzles, the obtained colour density 2 is however slightly lower over that period, for essentially the whole range of desired colour densities 3, and for essentially all four basic inks C, K, M, Y. An important conclusion is that the obtained, printed colour density 2 does not correspond to the desired colour density 1. At the C and K values, there is even saturation, while the obtained Y values are in average too low.

Figure 2B:
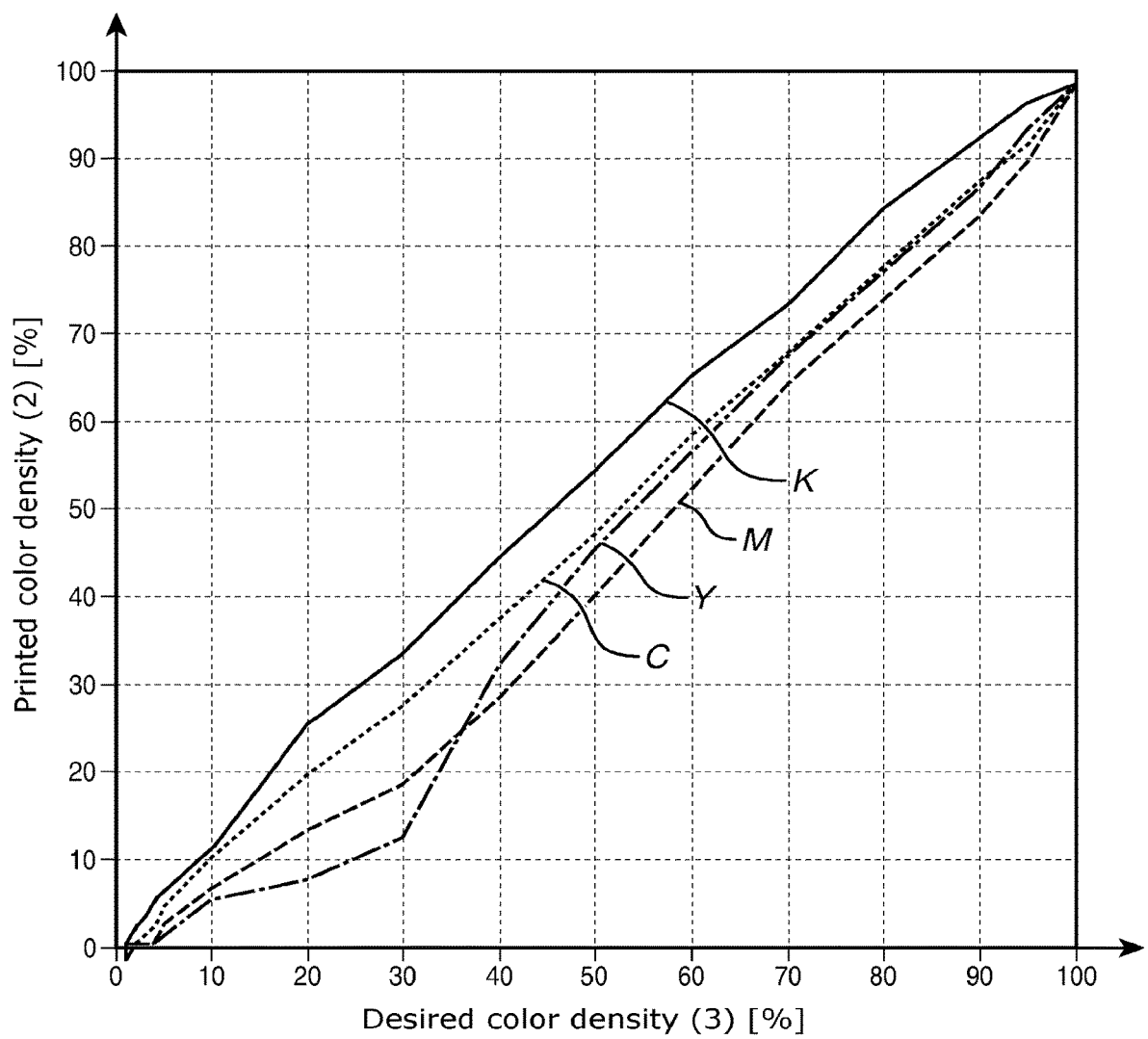
FIG. 2B shows another measurement of the effectively printed colour density, as a function of the desired colour intensity, when printing a modified electronic image file, according to a possible embodiment.

FIG. 2B shows another measurement of the effectively printed colour density 1, as a function of the desired colour intensity 2, when printing a modified electronic image file 5. For example, it relates to a modified image file 5 that was generated based on the original image file 4 of FIG. 2A, when applying the present invention. Thereby, there already is a much better correspondence of the obtained, printed colour density 2 with the desired colour density 3.

Example 1: Home Printing or Office Printing

In a possible embodiment, the printing device is a private printing device or a company printer (e.g. a laser printer or ink jet printer). The user can thus be a private user or a company. When he/she wants to finish a high-quality printing job, the user thereto logs into a web application. Subsequently, the printer model, as well as the firmware version of the printing device is automatically recognized, or selected via a drop-down menu. Alternatively, printer data are collected by means of information recognition based on a scanned invoice of the printing device. Such a scan should thereto be uploaded onto the web application. Furthermore, optionally, the paper type is given, as well as environmental parameters such as the temperature and humidity, and possible other information. In any case, the original image file is also uploaded onto the web application, in accordance with the printing job. Subsequently, the present system generates a modified image file that can be downloaded by the user. This modified image file comprises compensations for expected printing errors of the printing device, estimated based on the supplied information. For example, the printing device is thereto identified with a general printer profile that is stored in a database of the system. Finally, the user prints the modified image file, by means of the printing device. Optionally, the resulting print is also scanned and again uploaded onto the web application. This allows the system to further fine-tune said printer profiles, so that the quality of future printing jobs can still more be improved. For example, said services are offered by an external party for a remuneration. Only if the user delivers said scan, he/she can claim a discount. Of course, an alternative revenue model can also be applied.

Example 2: Label Printing In another possible embodiment, the user is a manufacturer and/or filler of cosmetics, care products or food. Thereby, it is particularly important that the colours and shapes on packagings and labels of such products are very precise. Each time a new label design must be printed, the corresponding (original) image file is sent by email to a specialized, external party, together with printer data of the targeted, digital printing device. This external party modifies that image file, and sends it in a next step back to the user. Subsequently, the labels are printed.

The indicated elements on the figures are:
C. Cyan
M. Magenta
Y. Yellow
K. Key
1. System
2. Printed colour density
3. Desired colour density
4. Original electronic image file
5. Modified electronic image file
6. Server
7. Electronic platform
8. Central processing unit
9. User device
10. Printing device
11. Scanning device
12. User system
13. Database It will be understood that the present invention is not limited to the embodiments described above and that some adjustments or changes can be added to the described examples and figures without changing the scope of the enclosed claims.

The invention claimed is:

1. A method for improving an image quality for printing an electronic image file by a user, the method comprising (a) receiving an uploaded original electronic image file from a user to a web application, (b) generating a modified electronic image file, at least based on the original image file, and (c) providing the modified image file to the user through the web application, for printing the modified image file by the user by means of a printing device of the user, characterized in that furthermore, printer data are also received from the user, which printer data relate to said printing device, and in which the modified image file is generated, taking into account said printer data without direct intervention with the user's printing device, including without direct intervention with either of firmware version update information or printer calibration information of the user's printer.

2. The method of claim 1, wherein the printer data comprise at least a printer model.

3. The method of claim 1, wherein an electronic platform is offered to the user, for the exchange of electronic image files and/or printer data with the user.

4. The method of claim 1, wherein the modified image file comprises a modified colour density with respect to the original image file.

5. The method of claim 1, wherein the modified image file is rasterized.

6. The method of claim 1, wherein the modified image file comprises compensations for one or more expected printing errors of the printing device.

7. The method of claim 1, wherein one or more environmental parameters are further also received of the user, which relate to an environment of the printing device.

8. The method of claim 1, wherein the modifications of the modified image file with respect to the original image file essentially relate to colours figuring in the human skin.

9. The method of claim 1, wherein furthermore, one or more scans of printed image files are further also received from the user.

10. The method of the previous claim 9, wherein a modified colour density is at least determined based on a printed colour density, as derived from said scans, and a desired colour density.

11. The method of claim 9, wherein a database is further also updated by means of information that is comprised by the printer data and/or said scans.

12. The method of claim 1, wherein the image files represent a print of packaging material and/or labelling material.

13. The method of claim 1, wherein a print of the modified image file possesses, by means of the printing device, a higher image quality than a print of the original image file, by means of the printing device without an increase of the amount of ink used therein.

14. The method of claim 1, wherein a print of the modified image file possesses, by means of the printing device, a similar image quality to a print of the original image file, by means of the printing device with a decrease of the amount of ink used therein.

15. Computer-implemented system for improving an image quality for printing an electronic image file by a user, the system comprising (a) receiving an uploaded original electronic image file from a user to a web application, (b) generating a modified electronic image file, at least based on the original image file, and (c) sending the modified image file to the user through the web application, for printing it the modified image file by the user by means of a printing device of the user, characterized in that a server is further configured for the receipt of printer data of the user, which printer data relate to said printing device, and is configured for generating the modified image file, taking into account said printer data without direct intervention with the user's printing device, including without direct intervention with either of firmware version update information or printer calibration information of the user's printer.

16. The system of claim 15, wherein said printer data comprise at least a printer model.

17. The system of claim 15, characterized in that the system further comprises at least one user device and at least one digital printing device, which printing device is coupled with said user device.

\* \* \* \* \*